(12) United States Patent
Buhler et al.

(10) Patent No.: US 9,904,557 B2
(45) Date of Patent: Feb. 27, 2018

(54) PROVISIONING OF OPERATING SYSTEMS TO USER TERMINALS

(75) Inventors: Peter Buhler, Horgen (CH); David Clerc, Verbier (CH); Luis Garcés-Erice, Rueschlikon (CH); Thomas Gschwind, Zurich (CH); John G Rooney, Zurich (CH); Andreas Schade, Langnau am Albis (CH); Paolo Scotton, Horgen (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

(21) Appl. No.: 14/347,650

(22) PCT Filed: Jul. 4, 2012

(86) PCT No.: PCT/IB2012/053394
§ 371 (c)(1),
(2), (4) Date: Jun. 30, 2014

(87) PCT Pub. No.: WO2013/046068
PCT Pub. Date: Apr. 4, 2013

(65) Prior Publication Data
US 2014/0317394 A1 Oct. 23, 2014

(30) Foreign Application Priority Data

Sep. 30, 2011 (EP) .................................. 11183535

(51) Int. Cl.
*G06F 9/44* (2006.01)
*G06F 21/57* (2013.01)

(52) U.S. Cl.
CPC .......... *G06F 9/4416* (2013.01); *G06F 21/575* (2013.01)

(58) Field of Classification Search
CPC ... G06F 9/4401; G06F 9/4416; G06F 9/45558
See application file for complete search history.

(56) References Cited

U.S. PATENT DOCUMENTS

| 7,979,260 | B1 * | 7/2011 | Sobel | G06F 9/4416 |
| | | | | 703/13 |
| 8,874,888 | B1 * | 10/2014 | Beda, III | G06F 9/4416 |
| | | | | 709/222 |

(Continued)

FOREIGN PATENT DOCUMENTS

| CN | 1013968770 A | 4/2009 |
| WO | WO 2008/008675 A2 | 1/2008 |
| WO | 2011075484 A2 | 6/2011 |

OTHER PUBLICATIONS

Bruley, Damien, "OS Streaming with Intel vPro", Intel, Virt-now, pp. 1-15.

(Continued)

*Primary Examiner* — Joe Chacko
(74) *Attorney, Agent, or Firm* — Cantor Colburn LLP

(57) ABSTRACT

Methods and apparatus are provided for provisioning an operating system image from a server (2) to an untrusted user terminal (4) via a data communications network (3). A trusted device (5) such as a pocket USB device has tamper-resistant storage (9) containing bootloader logic, for controlling booting of a user terminal, and security data. On connection of the trusted device (5) to an untrusted user terminal (4), the user terminal is booted via the bootloader logic on the trusted device. Under control of the bootloader logic, a connection is established to the server (2) via the network (3) and the server is authenticated using the security data on the trusted device (5). An operating system boot image is received from the server (2) via this connection. The boot image is used to provision an operating system (Continued)

image from the server (2) to the user terminal (4) for execution of the operating system at the user terminal (4).

16 Claims, 6 Drawing Sheets

(56) References Cited

U.S. PATENT DOCUMENTS

| | | | |
|---|---|---|---|
| 2005/0138414 A1* | 6/2005 | Zimmer | G06F 21/575 726/4 |
| 2006/0031547 A1* | 2/2006 | Tsui | G06F 9/4416 709/231 |
| 2006/0129797 A1* | 6/2006 | Durfee | G06F 21/575 713/2 |
| 2007/0140242 A1* | 6/2007 | DiGiorgio | H04L 12/1863 370/390 |
| 2009/0204964 A1* | 8/2009 | Foley | G06F 21/53 718/1 |
| 2010/0287363 A1 | 11/2010 | Thorsen | |
| 2011/0265183 A1* | 10/2011 | Wu | G06F 9/4401 726/24 |

OTHER PUBLICATIONS

Clerc, David et al, 'OS Streaming Deployment' Performance Computing and Communications Conference (IPCCC) 2010 IEEE 29th International Dec. 2010, p. 169-179, Switzerland.

Suzaki, Kuniyas, 'Release:InetBoot (GRUB+BuildRoot+HTTP-FUSE)' Debian Mailing List, Apr. 2008, Retrieved from the Internet: <URL:http://lists.debian.org.

Lenovo, "Secure Managed Client", Website: Retrieved at: http://shop.lenovo.com/ISS_Static/merchandising/US/sitelets/alternative_desktop_computing/popup_smc_tour.html.

Linux, "Secure Online Banking with Linux USB Live", Website: Retrieved at: http://shop.lenovo.com/ISS_Static/merchandising/US/sitelets/alternative_desktop_computing/popup_s.

Lok-IT, "Secure Flash Drive", Website: Retrieved at: http://www.lok-it.net/.

Tassa USCG Case Study, Tassa Corporation, Retrieved from the Internet at: <URL: http://www.tassacorp.com/white-paper/28.

* cited by examiner

PROVISIONING OF OPERATING SYSTEMS TO USER TERMINALS

CROSS-REFERENCE TO RELATED APPLICATIONS

This application claims priority under 35 U.S.C. §371 from PCT Application, PCT/IB2012/053394, filed on Jul. 4, 2012, which claims priority from the European Patent Application No. 11183535.1, filed on Sep. 30, 2011. The entire contents of both applications are incorporated herein by reference.

This invention relates generally to provisioning of operating systems to user terminals. Methods, apparatus and computer programs are provided for provisioning an operating system image from a server to an untrusted user terminal via a data communications network.

Remote desktop technology is a widely available means by which users can execute applications remotely over a network from user terminals connected to the network. Traditionally this has been achieved by running multiple instances of applications on sandboxes at a server to which users can connect via the network. More recent systems allow individual users to access their own virtual machines (VMs) running on the server infrastructure. Security is of course an important consideration with such systems. To this end, a client system for controlling remote desktop operation at the user end may be provided on a dedicated client device which is trusted by the parties in question. Such a system is described at http://www.tassacorp.com/white-paper/28 with the particular aim of preventing data from being downloaded and removed from a premise by system users. With this system, the dedicated client device has its own client operating system (pre-installed or provisioned (streamed) from the server prior to operation) which provides the functionality for secure connection to the remote server for remote desktop operation of a user's own VM operating system which itself runs on the server. Another such dedicated client device providing a virtual desktop environment is described in http://shop.lenovo.com/us/sitelets/alt-desktop/overview.

The great advantage of remote desktops is their simple manageability. All operating systems (OS's) are stored on the server and can be backed-up and upgraded in one central location. In addition, unless a dedicated client device is provided to enforce security as in the systems referenced above, users are free to use any arbitrary user terminal and are not tied to a specific machine or premises. However, remote desktop systems have distinct disadvantages. First, they do not scale well; the required amount of server resources, processor, memory and network increases linearly with the number of users. The price of this infrastructure increases at an even higher rate. In addition, the user terminal must always be connected to the server, making the system vulnerable to server or network outages and preventing users from working offline. Another fundamental problem with the remote desktop solution is that it does not use the significant resources available on user terminals.

An alternative solution is to provision the disk images of the OS from the server to the user terminal so that the OS can be executed at the user terminal. "OS Streaming Deployment", Clerc, Garces-Ericé and Rooney, IPCCC December 2010, describes a system for deploying OS images to user terminals by streaming such that OS operation can start before the image is fully installed at the terminal. Again, security needs to be considered with streaming systems for users to be assured that the OS is not compromised. Systems are known which stream the disk images of virtual machines available on the server to a hypervisor running on the user terminal. The hypervisor controls the streaming process and execution of the VMs at the user terminal. After the VM image is fully installed at the user terminal, the user can run the VM offline, returning modifications made on the image to the server at a later date. The XenDesktop product of Citrix Systems Incorporated provides such a system for streaming user VMs to user terminals (see http://www.citrix.com/English/ps2/products/subfeature.asp?contentID=2300411). A similar system is described in "OS Streaming with Intel vPro", ttp://communities.intel.com/servlet/JiveServlet/download/3629-1-2406/OS%20Streaming%20within%20Intel%20vPro%20technology.pdf. While these systems take advantage of resources on the user terminal, they require that the hypervisor running on the user terminal is trusted. This significantly restricts usability of such systems compared with a pure remote desktop system because any user of a terminal may compromise that terminal for all subsequent users.

Outside the remote desktop field, attempts to ensure OS security include booting a user machine from a USB (universal serial bus) storage device on which an encrypted OS is stored for installation on the machine. Such a USB drive system is described in http://www.windowsfordevices.com/c/a/News/Spyrus-Secure-Pocket-Drive-gets-patent-Citrix-certification/. The LOK-IT device of Systematic Development Group LLC (http://www.lok-it.net/) is similar. Booting of operating systems from USB devices is also described in: http://en.gentoo-wiki.com/wiki/Booting_encrypted_system_from_USB_stick; and http://linuxconfig.org/secure-online-banking-with-linux-usb-live. US Patent Publication No. 20100287363 A1 provides another example where validity of the OS is first verified by the user computer using a cryptographic key preinstalled on the motherboard.

One aspect of the present invention provides a method for provisioning an operating system image from a server to an untrusted user terminal via a data communications network. The method comprises, on connection to the user terminal of a trusted device having tamper-resistant storage containing bootloader logic, for controlling booting of a user terminal, and security data:

booting the user terminal via said bootloader logic on the trusted device;

under control of the bootloader logic, establishing a connection to the server via the network and authenticating the server using said security data on the trusted device;

receiving an operating system boot image from the server via said connection; and using the boot image to provision an operating system image from the server to the user terminal for execution of the operating system at the user terminal.

Embodiments of this invention allow an operating system image to be provisioned securely from a server to an untrusted user terminal. The user is provided with a trusted device, conveniently a small portable device such as a pocket USB device, which can be connected to a user terminal. This device, which can be supplied to the user by the system operator or other trusted entity, has tamper-resistant storage containing bootloader logic and security data. The user can select a convenient, though untrusted, user terminal and connect the trusted device. On connection, the user terminal is booted via the bootloader logic on the trusted device. The bootloader logic then establishes an authenticated connection over the network to the server providing access to the required OS image. The server is authenticated in this process using the security data pre-stored on the trusted device. An operating system boot image is then obtained from the server via the authenticated connection, and the boot image is used to provision the required OS image from the server to the user terminal so that the OS can be executed at the user terminal. This provides an elegantly simple system for securely provisioning an OS image over a network to an untrusted terminal. The authenticated connection to the server, verified via the security data in the tamper-proof storage, ensures that the OS is obtained from a trusted source and so can itself be trusted by the user. Moreover, the system allows users to utilize any arbitrary user terminal, exploiting the resources of the terminal to run the OS image, without requiring the terminal to be trusted. No OS or other potentially compromised software pre-installed on the user terminal is required for operation of the system, and so security risks otherwise inherent in use of untrusted terminals can be avoided. A trusted OS image can thus be securely installed on the "bare metal" of a terminal, i.e. using the basic machine hardware only, whereby integrity of the OS can be assured.

The OS image provisioned to the user terminal may be that of a user's virtual machine maintained at the server. However, a hypervisor can equally be securely provisioned via the process described. Hence an initial OS image, being that of a hypervisor, can be provisioned to the terminal on booting from the trusted device. Then at least one virtual machine image can be further provisioned from the server for execution of the virtual machine, under control of the hypervisor, at the user terminal. In this way, a user can work on one or more VMs at an untrusted terminal, with all software that is executed on the terminal, including the hypervisor itself, having been securely provisioned from the server.

Provisioning of the OS for execution at the user terminal could be implemented in a variety of ways. Some basic embodiments could simply download the entire OS image prior to operation of the OS at the user terminal. However, preferred embodiments implement the provisioning by streaming, whereby operation of the OS can commence more quickly at the user terminal. In particularly preferred embodiments, during streaming of the OS image, blocks of the image are copied to local storage at the user terminal, e.g. a hard disk of the user terminal, thereby to build up a local image of the operating system. In operation of the OS, required blocks can be accessed locally if available, or streamed from the server if not and then added to local storage. Blocks of the local OS image which are modified in operation can be copied back to the server via the network as convenient. This "streaming deployment" technique can speed up OS execution and ultimately enable offline operation of the user terminal. In particular, copying of OS image blocks can continue until the local OS image is substantially complete, i.e. at least sufficiently complete that the OS is capable of running independently of the provisioning connection to the server. The user can then disconnect from the server and use the terminal offline. Changes made to the local OS image during offline operation can be transferred back to the server at a later stage.

In some embodiments, the authenticated connection to the server may be established between the trusted device and the server via the user terminal. In other embodiments this connection is between the user terminal and the server and is not routed via the trusted device. For increased security, preferred provisioning methods include establishing an encrypted channel to the server and provisioning the operating system image over the encrypted channel. This encrypted channel could be established as the initial, authenticated connection via which the OS boot image is communicated to the terminal. However, for simplicity of implementation, the encrypted channel may be established separately after receipt of the boot image via the initial connection. The OS image blocks are thereby encrypted in transit from the server. In embodiments which build up a local OS image by storing blocks locally, the blocks may be stored in their encrypted form in the local storage. This ensures that blocks copied to local storage cannot be read by unauthorized parties not in possession of the appropriate decryption key. Decryption/encryption of blocks written locally may be performed dynamically in operation for maximum security.

Particularly preferred embodiments include establishing a mutually-authenticated, end-to-end encrypted channel between the server and the trusted device, via the user terminal, for secure communication of data between the server and trusted device. This channel could be the aforementioned initial connection and/or encrypted channel for provisioning the OS image. However, efficient implementations may provide this server-to-trusted device channel separately of the OS provisioning channel, whereby OS image blocks need not be routed via the trusted device to the user terminal. This server-device channel can be used for the most security sensitive communications, e.g. communication of cryptographic keys used in operation of the system. For example, a key for decryption of the operating system image blocks may be received from the server via this secure channel and stored in the secure storage of the trusted device. In preferred embodiments, set-up of this secure channel involves user input to confirm that the user is appropriately authorized, e.g. input of a valid password or PIN (personal identification number) via a user interface of the trusted device or insertion of a smart card identifying the user in the trusted device.

A second aspect of the invention provides a device for controlling provisioning of an operating system image from a server to an untrusted user terminal via a data communications network. The device comprises a terminal interface for connection of the device to a user terminal, and tamper-resistant storage containing bootloader logic and security data. The bootloader logic is adapted, on connection of the device to the user terminal via the terminal interface, to control:

booting of the user terminal;

establishment of a connection to the server via the network and authentication of the server using said security data on the trusted device;

receipt of an operating system boot image from the server via said connection; and use of the boot image to provision an operating system image from the server to the user terminal for execution of the operating system at the user terminal.

In systems providing for offline use of the user terminal as discussed above, the bootloader logic may be further adapted, on booting of the user terminal, to check whether an offline indicator is set signifying availability, in local storage at the user terminal, of a local OS image already provisioned to the user terminal during a pending session with the server. The offline indicator could be maintained in any local storage accessible to the bootloader logic, but is conveniently a simple flag at the start of the hard disk of the user terminal. If the offline indicator is found to be set, the bootloader logic then controls booting of the local OS image for execution on the user terminal. Such booting of a previously-provisioned, local OS image may be subject to performance of an integrity check for the local image by the bootloader logic.

Another aspect of the invention provides apparatus for provisioning an operating system image to an untrusted user terminal via a data communications network. The apparatus comprises: a server for providing access to the operating system image via the network; and a device according to the second aspect of the invention for controlling provisioning of the operating system image from the server to an untrusted user terminal on connection of the device to the user terminal.

Another aspect of the invention provides a computer program comprising program code means for causing a computer to perform a method according to the first aspect of the invention. (It will be understood that the term "computer" is used in the most general sense and includes any device, component or system having a data processing capability for implementing a computer program. Moreover, a computer program embodying the invention may constitute an independent program or may be an element of a larger program, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form).

In general, where features are described herein with reference to an embodiment of one aspect of the invention, corresponding features may be provided in embodiments of another aspect of the invention as appropriate.

Preferred embodiments of the invention will now be described, by way of example, with reference to the accompanying drawings in which.

Figure 1:
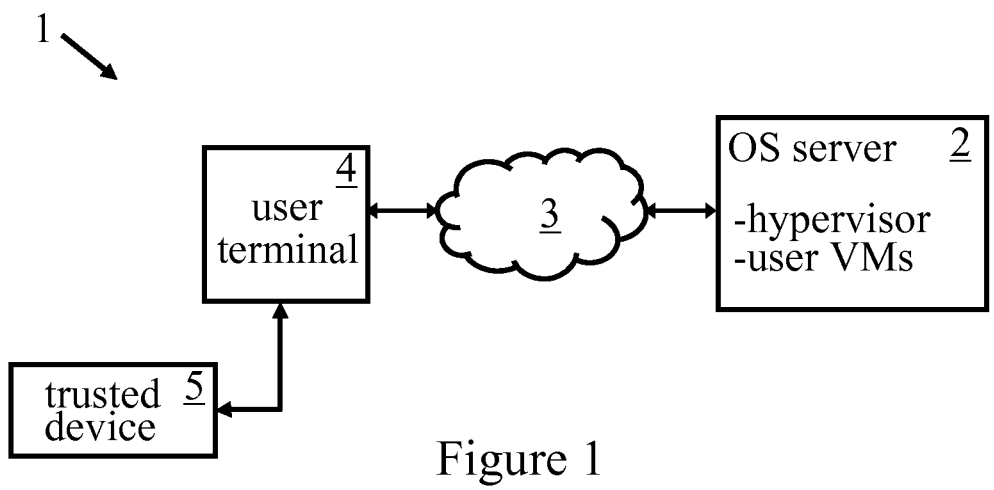
FIG. 1 is a schematic illustration of an OS provisioning system embodying the invention.
Figure 3:
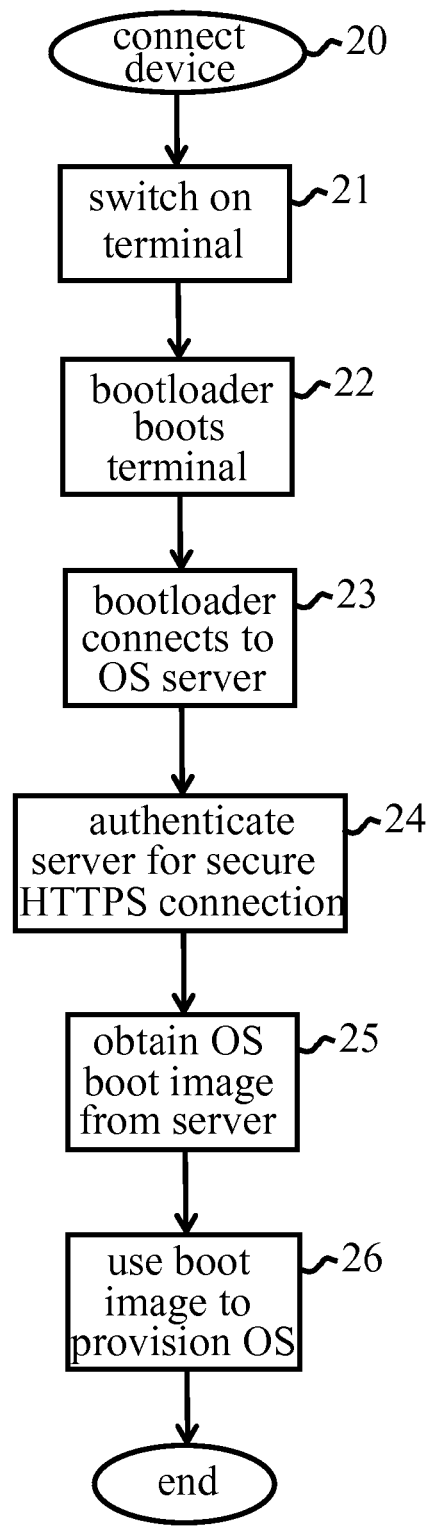
Figure 4:
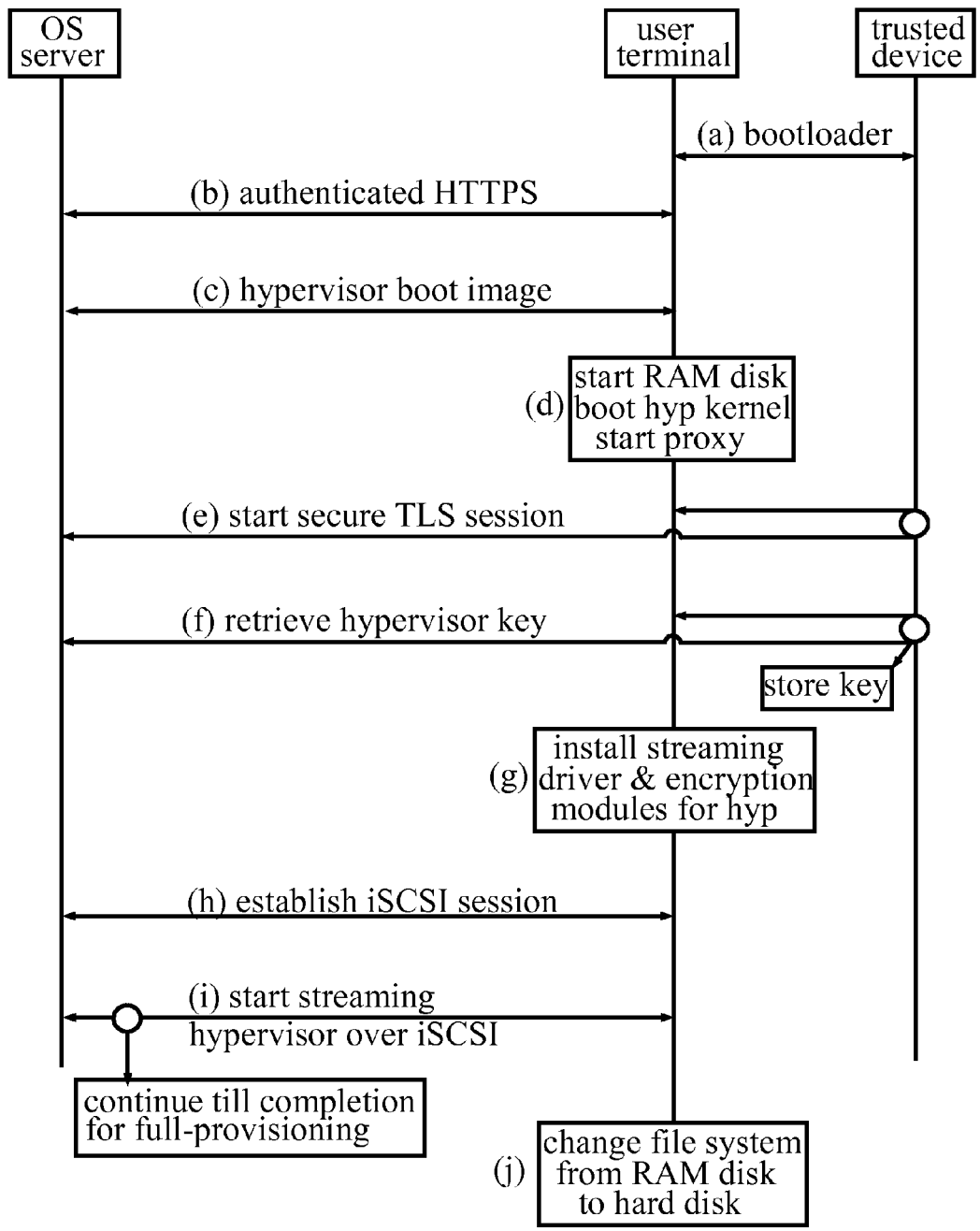
Figure 5:
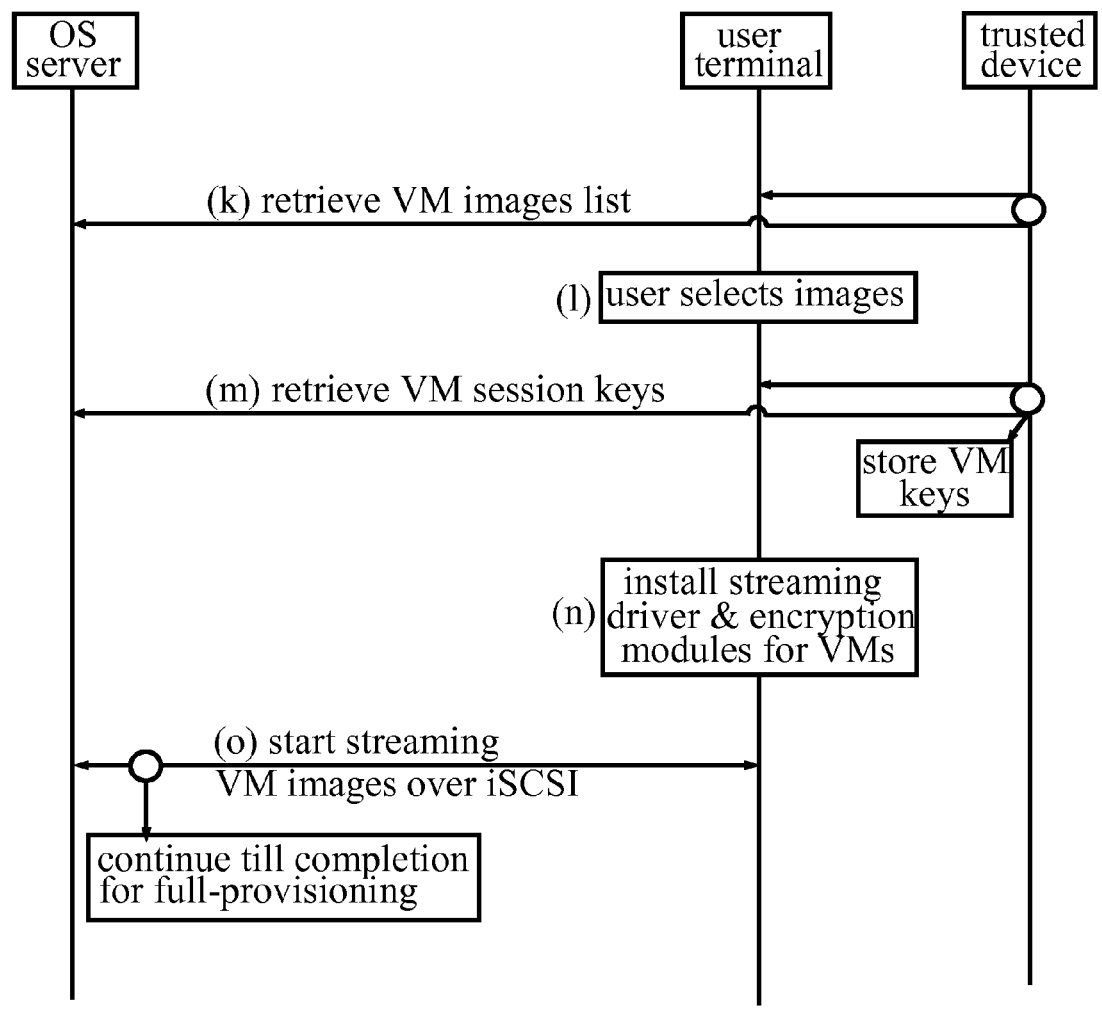
Figure 6:
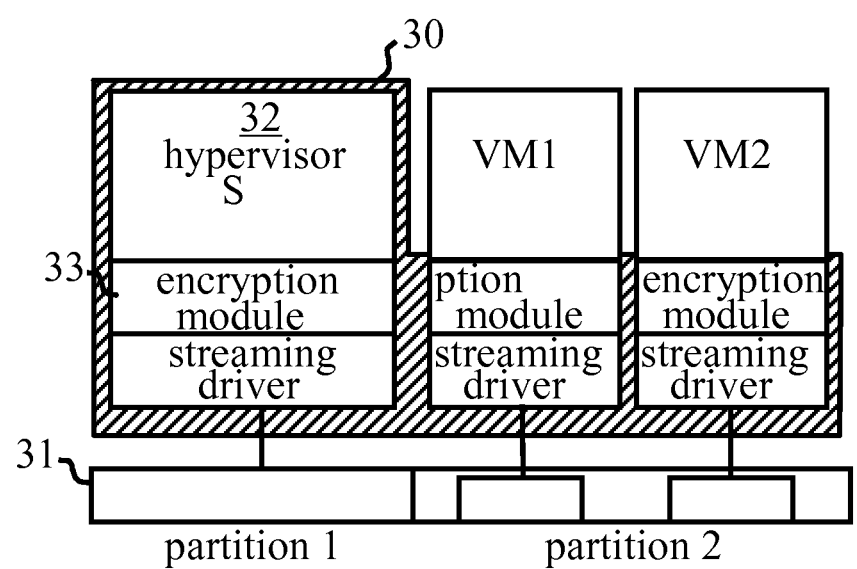
Figure 7:
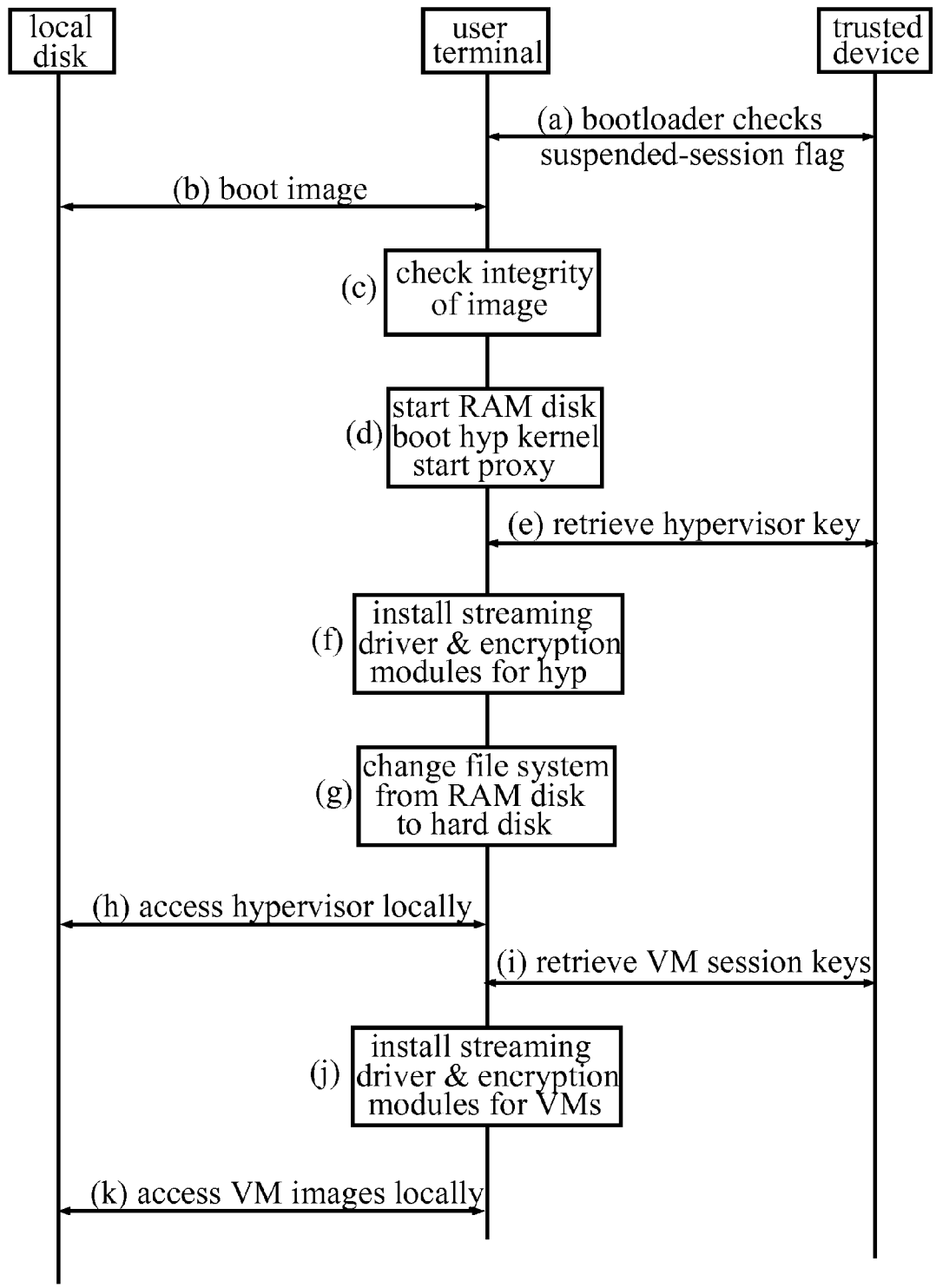

FIG. 3 indicates key steps of an OS provisioning process in the FIG. 1 system;

FIG. 4 indicates more detailed steps of an OS provisioning process in the FIG. 1 system;

FIG. 5 indicates subsequent steps of the OS provisioning process of FIG. 4;

FIG. 6 is a schematic representation of the architecture of a user terminal provisioned via the process of FIGS. 4 and 5; and FIG. 7 indicates steps in offline operation of the provisioned user terminal.

FIG. 1 illustrates the basic components of an OS provisioning system 1 embodying the invention. The system comprises an OS server 2 from which operating systems can be provisioned to user terminals connected to the server via a data communications network 3. Server 2 maintains OS images on behalf of users, providing access to these images via the provisioning process. In this example, the OS images which can be provisioned by server 2 comprise a hypervisor for general use by all users and a set of virtual machines which are specific to individual system users. Though indicated as a single block in the figure, server 2 may in general comprise one or more machines of a server system providing the OS provisioning functionality described. Network 3 may in general comprise one or more component networks and/or internetworks. A single user terminal 4 is shown connected to network 3 in the figure. The user terminal 4 might be any general-purpose computing device, e.g. an ordinary user computer such as a desktop, laptop, PDA (personal digital assistant), mobile phone, etc. In particular, terminal 4 need not be trusted by either the user or the operator of server 2. The provisioning of terminal 4 is controlled by a trusted device 5 which may be supplied to the user by the system operator and can be connected to terminal 4. A variety of form-factors might be envisaged for trusted device 5, but this device is most conveniently a pocket device, i.e. a small, portable device of a size to be easily carried in a user's pocket. In this preferred embodiment, device 5 is a pocket USB storage device as illustrated in more detail in FIG. 2.

Figure 2:
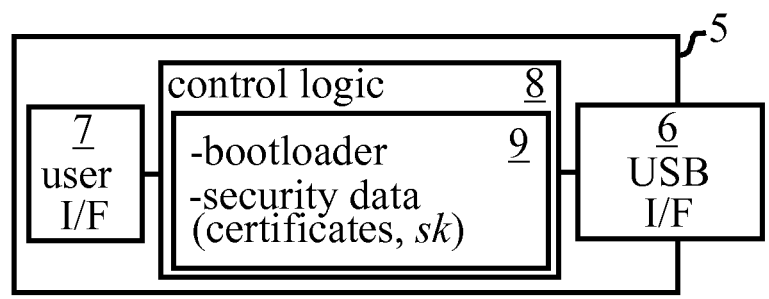
FIG. 2 is a more detailed schematic of a trusted device of the FIG. 1 system.

FIG. 2 is a schematic block diagram showing the main components of trusted device 5. The device has a terminal interface (I/F), here a USB interface 6, for connecting the device to user terminal 4. The device also has a user interface 7 for interaction with the device user. User interface 7 in this example comprises a display and a basic key input mechanism whereby information can be displayed to the user in operation and the user can input responses, instructions, etc. to the device. The device 5 includes control logic 8 for controlling operation of the device generally. Control logic 8 includes secure (tamper-resistant) storage 9 which contains bootloader program logic and security data. The bootloader logic (or simply "bootloader") comprises the program code (and any associated data) for implementing the functionality described in detail below. The security data here comprises cryptographic certificates used for server and user authentication, and a private key (secret key) sk of a cryptographic public/private key pair assigned to the particular user of device 5. Control logic 8 can be implemented by a combination of hardware and software, the secure storage 9 being physically protected against tampering in any convenient manner so as to inhibit interference with the contents. For example, storage 9 could be embodied by one or more self-destructing data containers such that tampering results in destruction or otherwise renders the device unusable, and/or control logic 8 may be implemented as a secure chip embedded in device 5 using tamper-resistant epoxy.

The bootloader logic in trusted device 5 provides the functionality to control implementation of the OS provisioning process in system 1. The bootloader logic may in general comprise one or more bootloader component modules for implementing the functionality described. In this particular example, the bootloader comprises a Master Boot Record (MBR), a mini-bootloader, and a network bootloader. The operation of these components will be described first for a basic OS provisioning process in system 1.

The flow diagram of FIG. 3 gives an overview of the OS provisioning operation indicating key steps of the process. Operation commences when the user selects an arbitrary user terminal 4 and connects trusted device 5 to a USB port of the terminal. This is represented by step 20 in the figure. At step 21 the user switches on the terminal machine. The firmware of terminal 4 might be set to boot automatically off the USB storage (e.g. as a preferred option where available), or the user can select this option in the usual manner at the terminal on power-up. The part of secure storage 9 visible to the terminal firmware is enabled to be bootable, containing the aforementioned bootloader components inside a bootable partition. Hence, in step 22, the terminal boots from the trusted device, the bootloader components controlling a chain of booting culminating in the network bootloader being started. In step 23, the network bootloader connects to the OS server 2 (e.g. to an initial boot server of OS server 2) over network 3. In step 24, the network bootloader accesses the appropriate server certificate stored in the security data of secure storage 9 (e.g. the certificate for the initial boot server) and authenticates the server, establishing a secure HTTPS (Hypertext Transfer Protocol Secure) connection with the server. In step 25, a boot image for the OS to be provisioned to the terminal is received from the server via the HTTPS connection. In particular, the network bootloader copies the (encrypted) boot image from the server over the secure connection. The prior authentication of the server ensures that the received boot image can be trusted. This boot image, an example of which is described below, comprises at least the minimal contents necessary to establish the provisioning environment. In step 26, the network bootloader uses the boot image to provision the required OS image to user terminal 4. In particular, the boot image is used to set up the OS provisioning environment in which the OS image is provisioned from the OS server 2 for execution on the terminal machine. Particular examples of this process are detailed below. Since the OS image is obtained in this way from a trusted server, integrity of the OS can be assured. The OS image is provisioned in step 26 for as long as required (discussed further below), whereupon the basic provisioning process of FIG. 3 is complete.

In this preferred embodiment, the basic process described above is used to provision a user terminal 4 with both a hypervisor and one or more virtual machine images accessible to the user in question. The virtual machine images can then be executed at the user terminal under control of the hypervisor. Provisioning is performed by streaming, and more particularly by streaming deployment whereby blocks of the images streamed from the server are copied to local storage at the user terminal, thereby to build up a local image of the OS in question. Key steps of this process for the initial provisioning of the hypervisor are described below with reference to FIG. 4.

FIG. 4 indicates successive steps in provisioning of the hypervisor as performed by the OS server 2 (indicated on the left of the figure), the user terminal 4 (centre-right of the figure) and trusted device 5 (right-hand side of the figure). Step (a) of this figure corresponds generally to steps 20 to 22 of FIG. 3 whereby user terminal 4 (initially in its "bare metal" state) is booted via the bootloader logic on trusted device 5. In step (b), the authenticated connection to server 2 is established by the network bootloader corresponding to steps 23 and 24 of FIG. 3. Step (c) corresponds to step 25 of FIG. 3 whereby the encrypted boot image for the hypervisor is received from server 2. The boot image comprises a kernel for the hypervisor and an initial RAM disk containing program logic for facilitating subsequent provisioning of the hypervisor. In this example, the RAM disk contains: the device drivers required for network connectivity in the operations described below; a streaming device driver (hereinafter "streaming driver") providing the streaming logic for controlling streaming deployment of the hypervisor image from the server; an encryption module providing program logic for encryption/decryption of the streamed hypervisor image blocks; and a proxy application for the trusted device. Next, in step (d), the network bootloader decrypts the hypervisor boot image, installs it into a memory disk of the terminal, and then boots it. The RAM disk is thus started and the hypervisor ("hyp") kernel booted on the user terminal. In addition, the network bootloader starts the proxy application for the trusted device 5 on user terminal 4. This proxy provides for routing of required packets received from server 2, or sent by terminal 4, via the trusted device for encryption/decryption as required by subsequent steps of the process. Such proxy applications are well known and suitable implementations will be readily apparent to those skilled in the art.

Once the proxy has been started, in step (e) of the process, the control logic 8 of trusted device 5 establishes a mutually-authenticated, end-to-end encrypted channel between the OS server 2 and the trusted device 5, via the user terminal 4, for secure communication of data between the server and trusted device with the aid of the proxy application. This secure channel uses the TLS (Transport Layer Security) protocol in this example. In establishing the TLS session, the OS server is authenticated by control logic 8 using the appropriate certificate from secure storage 9 (i.e. the certificate for the particular server machine at OS server 2 with which the current channel is to be established, this potentially being different to that authenticated in step (b) above). In addition, the control logic 8 authenticates the trusted device to server 2 by means of the user certificate held in secure storage 9. Ideally, as part of this authentication step, the user is required to verify his authority to use the device by entering an appropriate PIN or password via the device user interface 7. Once the secure TLS channel is established, encrypted communications from the server can be decrypted by trusted device 5 using the private key sk held in secure storage 9. This secure channel is used by control logic 8 in step (f) of FIG. 4 to obtain a key for decryption of the hypervisor image blocks to be streamed in the ensuing process. This hypervisor key is stored in secure storage 9 and made available by control logic 8 as required in subsequent operation.

In step (g) of FIG. 4, the network bootloader installs the hypervisor encryption module and streaming driver received in step (d) above. Next, in step (h), the network bootloader establishes a further encrypted channel to the OS server using the iSCSI (internet Small Computer System Interface) protocol. This channel is then used by the hypervisor streaming driver in step (i) to provision the encrypted image blocks of the hypervisor from OS server 2. Note that packets on this channel are not routed via the trusted device 5. However, the hypervisor image blocks streamed over this channel are encrypted under the key transmitted to the trusted device via the TLS channel in step (f). Thus, security is ensured whilst permitting faster operation than would be achievable with all packets routed via device 5. The streaming driver stores the hypervisor image blocks received from server 2 in local storage, in this example a hard disk, at user terminal 4. In this way, a local image of the hypervisor is gradually built up as streaming proceeds. This streaming deployment process can be continued until the terminal is "fully provisioned", i.e. the local image is effectively complete, as discussed further below. In any case, in step (j) of the FIG. 4 process the network bootloader changes the local file system from the RAM disk to hard disk. The hypervisor provisioning process is then fully established and the hypervisor is ready for execution at the user terminal under control of the streaming driver.

Once the hypervisor is running, one or more user VMs can be further provisioned to the user terminal. The basic process here is indicated in FIG. 5 as a continuation of the FIG. 4 process. Hence, in step (k) of FIG. 5, the hypervisor obtains a list of virtual machines that the current user is authorized to access at OS server 2. The hypervisor obtains this VM list from the trusted device 5 which in turn receives it from the OS server over the secure TLS channel established in step (e) above. The VM list can be presented to the user at the terminal 4 using a window manager of the hypervisor. In step (l) the user chooses one or more of these VM images to boot and the selection is passed by the hypervisor to the control logic 8 of trusted device 5. In step (m) the control logic 8 obtains a session key for each of the selected VMs from OS server 2 via the secure TLS channel.

These session keys are required to decrypt the image blocks of the respective VMs in the ensuing operation. The session keys are stored in secure storage 9 and made available to the hypervisor for controlling VM operation. Meta data about the virtual machines to be provisioned, e.g. OS type, hardware specification, memory requirements, etc., is also obtained with the session keys and supplied to the hypervisor by control logic 8. For each user VM, in step (n) of the process the hypervisor creates and installs a distinct instance of the streaming driver together with an associated encryption module for encryption/decryption of the VM image blocks via the corresponding session key. In step (o), the hypervisor then commences streaming of the encrypted VM image blocks from the OS server over the iSCSI channel, allowing VM execution at the user terminal. Again, streaming deployment is performed for each VM image under control of the associated streaming driver set up by the hypervisor, whereby a local VM image is gradually built up at terminal 4. As before, this can be continued until the local VM image is complete to obtain a fully-provisioned machine.

FIG. 6 shows a simplified schematic of the virtual system architecture obtained via the above provisioning process. This example assumes that two user VMs, labeled VM1 34 and VM2 35, are provisioned to the user terminal for execution under hypervisor control. The overall hypervisor functionality is indicated by the shaded block 30. The terminal hard disk is represented at 31. The physical disk 31 is partitioned such that a first partition is reserved for the hypervisor and a second partition for the set of user VMs. The root device of the hypervisor is its streaming driver. This streaming driver controls access to the first partition, ensuring that all blocks are copied locally as and when required. In particular, the driver retrieves blocks locally if available or streams blocks from the server and copies them locally if not. (The streaming driver may be based, for example, on that described in the IPCCC paper referenced above, and suitable implementations will be readily apparent to those skilled in the art from the description of operation herein). The blocks are stored in encrypted form and are made available in unencrypted form to the core hypervisor system, indicated at 32, via the hypervisor encryption module indicated at 33. This module performs dynamic encryption/decryption of the hypervisor blocks using the hypervisor key obtained at step (f) of FIG. 4. The arrangement for individual VMs is similar, the associated instance of the streaming driver being used as the disk of the virtual machine. The blocks for each VM, comprising that VM's own OS plus user applications running on this OS, are encrypted/decrypted dynamically by the associated encryption module using the session key for that VM. The streaming process is thus transparent to the OS running inside the VM; streaming happens in the hypervisor 30.

Image blocks modified locally can be copied back by the hypervisor to the server 2 via the network, either immediately or at some convenient later time, e.g. periodically during a VM session. A VM session remains open only while the trusted device 5 is connected to terminal 4. If the trusted device is removed, the hypervisor could simply freeze the session, blocking further input, or could close the session. Closing a session involves writing back any unwritten data to the server, terminating all the iSCSI sessions, closing down the VMs and then terminating the hypervisor. The data on disk is only readable via the session keys which are lost with removal of the session. All data on disk thus becomes unreadable. A session can also be aborted by turning off the machine, whereupon the server will mark the aborted session as closed. Again, the data on disk can never be read as the session key has been lost.

Assuming the machine has been fully-provisioned with a local image of the hypervisor and the required VMs, this provides the basis for subsequent "offline" operation, i.e. running independently of a streaming connection to server 2. In particular, the user can switch to offline mode by first informing the hypervisor to complete the deployment. The hypervisor reads its entire root disk to ensure that all blocks are available locally and performs the same operation on all open virtual machines. Having completed the deployment, the hypervisor also downloads a boot image from server 2 via the secure TLS channel and writes this to the boot partition of the local disk. This boot image is well-known and its size and signature (hash) are known to the minibootloader on trusted device 5. The session keys are kept in secure storage 9 of device 5 and the hypervisor marks the partition by setting an offline indicator, here a simple flag at the beginning of the local disk.

The subsequent reactivation of a session in offline mode is indicated by the steps of FIG. 7. Here, the left-hand vertical of the figure represents the local disk 10 of the user terminal 4, and the centre vertical the fully-provisioned user terminal. At the next boot as indicated at step (a) of this figure, the minibootloader checks the offline flag at the beginning of the disk, identifies this as set and so assumes that the entire set of blocks is available locally. In step (b), the mini-bootloader loads the boot image from the boot partition into memory, and performs an integrity check for the local image in step (c). In particular, the minibootloader calculates a cryptographic hash of the boot image and compares this to the known value. Only if integrity of the local image is confirmed in this way may the user resume the session in offline mode. The hypervisor then boots from the contents loaded in memory by the minibootloader. (Note that, contrary to the online case, this boot image may be composed of the kernel and initial RAM disk of the hypervisor without modifications required to access the streaming infrastructure: all the contents on the machine are trusted by virtue of their origin (streamed previously from the trusted infrastructure), their state (encrypted with a key available from the trusted device) and/or their integrity (the boot image on disk is the only non-encrypted data, and this is verified at boot as explained)). The RAM disk is thus started in step (d) and the hypervisor kernel booted on the user terminal. In addition, the minibootloader launches the proxy on user terminal 4. In step (e) the minibootloader retrieves the hypervisor key via the proxy from trusted device 5, and installs the hypervisor encryption module and streaming driver in step (f). In step (g) the minibootloader changes the local file system from the RAM disk to hard disk. The hypervisor can then be accessed from the local disk as indicated at step (h) and is ready for execution under control of the streaming driver. In step (i) the hypervisor retrieves the session keys for the pending VMs from the trusted device 5. For each user VM, in step (j) the hypervisor installs an associated streaming driver and encryption module. The VMs can then be accessed from the local disk as indicated at step (k) and are ready for execution at the user terminal using the recovered session keys.

It will be seen that the foregoing provides a highly efficient process for securely provisioning OS images from a server to untrusted user terminals. Since the device 5 originates from a trusted source and the contents of secure storage 9 cannot be modified by the user or the terminal machine, the device 5 can be trusted by the parties to the system. No (potentially compromised) software pre-installed on the terminal machine is required for the provisioning operation. All software that is executed on the terminal machine, including the hypervisor itself, is securely provisioned from the server. The user terminal can therefore be any, arbitrary computing device, untrusted by parties to the system, as opposed to a dedicated client device designed to support the provisioning operation. The user can thus select any convenient terminal to work on, unrestricted by provenance, use, location, etc., exploiting the local resources of the terminal for running his VMs.

It will be appreciated that many changes and modifications can be made to the exemplary embodiments described above. By way of example, functionality associated with one or more of the different channels used in FIGS. 4 and 5 might be combined in other embodiments. In particular, in some embodiments the initial authenticated connection to the server may be established between the trusted device and the server via the user terminal. Also, the local OS image blocks could be stored on local storage other than the terminal hard disk, for instance a USB key, external SSD (solid-state drive), SD (Secure Digital) card, etc., for subsequent offline booting if desired. Such a portable disk can later be used at another terminal if desired. As another example, in some embodiments the hypervisor and/or VM session keys could be pre-stored in the secure storage of trusted device 5 instead of being issued dynamically by the OS server. A single VM session key may be provided for all the user's VMs. Other form factors for trusted device 5, e.g. having terminal interfaces other than a USB interface, can of course be envisaged. In some embodiments, user authentication could be performed via a smart card identifying the user which is inserted in the trusted device. Many other changes and modifications can be made to the embodiments described without departing from the scope of the invention.

The invention claimed is:

1. A method for provisioning an operating system image from a server to an untrusted user terminal via a data communications network, the method comprising: creating a connection to an untrusted user terminal of a trusted device having a tamper-resistant storage, wherein the tamper-resistant storage comprises bootloader logic for controlling booting of the untrusted user terminal and security data; booting the untrusted user terminal via said bootloader logic on the trusted device; establishing a connection, under control of the bootloader logic, to the server via the data communications network and authenticating the server using said security data on the trusted device; sending a boot image from the server to the untrusted user terminal via said connection; using the boot image to provision an operating system image from the server to the untrusted user terminal; wherein said boot image comprises a first portion of the operating system and an initial RAM disk that contains program logic for facilitating provisioning of a second portion of the operating system; wherein the untrusted user system is configured to, upon receipt of the boot image: start the RAM disk; boot the untrusted user terminal using the first portion of the operating system; and use the program logic in the RAM disk to receive image blocks of the second portion of the operating system via a streaming deployment process;

copying the image blocks of the second portion of the operating system to local storage at the untrusted user terminal to build up a local image of the operating system; and copying blocks of the local operating system which are modified in operation of the operating system at the untrusted user terminal back to the server via the said connection.

2. The method as claimed in claim 1, wherein said operating system is a hypervisor.

3. The method as claimed in claim 2, further comprising: provisioning at least one virtual machine image from the server to the untrusted user terminal, via a streaming deployment process, for executing the virtual machine at the untrusted user terminal, wherein the untrusted user terminal is under control of the hypervisor.

4. The method as claimed in claim 1, further comprising: copying said image blocks to a hard disk of the untrusted user terminal.

5. The method as claimed in claim 1, wherein copying of said image blocks continues until the local operating system is complete.

6. The method as claimed in claim 1, wherein said connection is established between the trusted device and the server via the untrusted user terminal.

7. The method as claimed in claim 1, further comprising: establishing an encrypted channel to the server; and provisioning the image blocks of the second portion of the operating system image over the encrypted channel.

8. The method as claimed in claim 1, further comprising: storing the image blocks in encrypted form in said local storage.

9. The method as claimed in claim 1, further comprising: establishing a mutually-authenticated, end-to-end encrypted channel between the server and the trusted device, via the untrusted user terminal, to secure communication of data between the server and trusted device.

10. The method as claimed in claim 7, further comprising: receiving a cryptographic key, for decrypting of the operating system image, from the server via the mutually-authenticated channel; and storing the key in the secure storage of the trusted device.

11. A computer readable non-transitory article of manufacture tangibly embodying computer readable instructions which, when executed, cause a computer to carry out the steps of a method according to claim 1.

12. A device for controlling provisioning of an operating system image from a server to an untrusted user terminal via a data communications network, the device comprising: a terminal interface for connecting the device to the untrusted user terminal; and a tamper-resistant storage containing bootloader logic and security data, wherein when the device is connected to the terminal interface, the bootloader logic is adapted to execute a method comprising: booting the untrusted user terminal via said bootloader logic on the trusted device; establishing a connection, under control of the bootloader logic, to the server via the data communications network and authenticating the server using said security data on the trusted device; sending a boot image from the server to the untrusted user terminal via said connection; using the boot image to provision an operating system image from the server to the untrusted user terminal; wherein said boot image comprises a first portion of the operating system and an initial RAM disk that contains program logic for facilitating provisioning of a second portion of the operating system; wherein upon receipt of the boot image, the untrusted user terminal is configured to: start the RAM disk; boot the untrusted user terminal using the first portion of the operating system, use the program logic to receive image blocks of the second portion of the operating system via a streaming deployment process; copying the image blocks of the second portion of the operating system to local storage at the untrusted user terminal to build up a local image of the operating system, and copying blocks of the local operating system which are modified in operation of the operating system at the untrusted user terminal back to the server via the said network.

13. The device as claimed in claim 12, wherein the bootloader logic is further adapted to execute the following: checking whether an offline indicator is set signifying availability, in local storage at the untrusted user terminal, of a local operating system image already provisioned to the untrusted user terminal from the server upon booting of the untrusted user terminal; and controlling the booting of the local operating system image for executing the untrusted user terminal.

14. The device as claimed in claim 13, wherein the bootloader logic is further adapted to execute the following: checking an integrity of the local image; and controlling booting subject to said integrity being confirmed.

15. The device as claimed in claim 12, further comprising a user interface for communication with a user of the device.

16. The device as claimed in claim 12, wherein the device is a pocket USB device.

\* \* \* \* \*